United States Patent
Lee et al.

(10) Patent No.: US 6,427,233 B1
(45) Date of Patent: Jul. 30, 2002

(54) METHOD FOR ADDRESSING THE DYNAMIC WINDOWS

(75) Inventors: Peng Lee, Tien Chin (CN); Hsuan-Tung Chen; Kuang-Hsin Lin, both of Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/465,302

(22) Filed: Dec. 17, 1999

(51) Int. Cl.$^7$ ................................................ G06F 9/44
(52) U.S. Cl. ..................... 717/125; 717/125; 345/804; 345/853; 714/26; 714/46
(58) Field of Search ................. 717/124–133; 714/26, 46; 345/719, 804, 853

(56) References Cited

U.S. PATENT DOCUMENTS

| | | | | |
|---|---|---|---|---|
| 5,369,756 A | * | 11/1994 | Imura et al. | 714/26 |
| 5,452,468 A | * | 9/1995 | Peterson | 345/419 |
| 5,764,230 A | * | 6/1998 | Baradel et al. | 345/804 |
| 6,282,701 B1 | * | 8/2001 | Wygodny et al. | 717/125 |
| 6,298,454 B1 | * | 10/2001 | Schleiss et al. | 717/125 |

* cited by examiner

Primary Examiner—Tuan Q. Dam
Assistant Examiner—Chuck Kendall
(74) Attorney, Agent, or Firm—Stroock & Stroock & Lavan LLP

(57) ABSTRACT

A method for addressing the dynamic windows. The method uses a script interpreter, addressing identification module, and current windows layer description module combined together. When an operational unit is read from a script interpreter, it will generate a windows description. Input said windows description into a addressing identification module and hook the windows description by a current windows layer description module at the same time. The current windows layer description module will construct a windows description tree structure and the addressing identification module will calculate according to this tree structure. Complete the calculation and conclude a current windows identifier code to be operated by the tester.

16 Claims, 4 Drawing Sheets

METHOD FOR ADDRESSING THE DYNAMIC WINDOWS

FIELD OF THE INVENTION

The present invention relates to a method for addressing the dynamic windows, and particularly to a method to detect the error message and addressing it when a windows based program is executed.

BACKGROUND OF THE INVENTION

As computer software applications expand, the need becomes acute to assess the reliability of the software such that appropriate corrective action can be taken prior to releasing the software. Since software products become more and more lengthy and complex, the software product tests also have become more lengthy and complex, requiring ever increasing amounts of time to perform. Assuring the reliability of software by effective testing helps to minimize software development costs, improve software quality, increase productivity, and shorten the software development period.

Nevertheless, it happens that a user run a software program and an unexpected failure of the program takes place suddenly. Even the most carefully designed software typically has defects ("bugs") that cause the software to operate improperly or in an unexpected manner under certain conditions. For example, software "bugs" can cause errors such as an incorrect output format or system failure causing serious economic damage.

Generally, testing software includes performing several different tasks. One such task is to generating test programs and test data. Test programs and test data are typically included in a test suite and used to test and verify the correctness of certain aspects of software. For example, test programs are used to test the correctness of an object file produced by a compiler. Another part of software testing includes problem detection. In other words, a technique is used to detect when software does not perform as expected. For example, a compiler compiles a particular computer program and produces an object files that is then linked and incorporated into a machine executable. The machine executable is subsequently executed and produces a corresponding output.

Typically, features of the software program are not totally independent. For example, most software products are constructed using a number of subroutines, calls, branches, loops, and other program techniques. These techniques perform operations that are common to multiple independent portions of the software, and therefore are often repeatedly used by different parts of the program in which they are incorporated. Moreover, if the software program is changed, the tester must tediously change each test case to reflect the changes. One technique used to test the software procedures is by input simulation of a user to test different subroutines, calls, branches or loops. Referring to FIG. 1, an ordinary input simulation of software testing is proceeded. Generally, input characters A, B and C are shown on the screen of monitor sequentially in square 100, 110, 120 when target program operates properly. However, there are still some drawbacks in conventional windows based software with detection problem. Referring now to FIG. 2, the input character A is shown in square 200, when a subsequent character B is input as shown in square 210, the software detects the improper input of this character and normally a pop-up windows will shown as square 220 and disappear all of a sudden. In this specific example, even though the questioning windows 220 is shown for a few moment and the tester also aware of the abnormal situation, the tester can only try to repeat the procedures and have no idea why the defect happened, not to mention correctly and accurately addressing the location of defect.

In light of the above, when a conventional software debugging by the use of manual input simulation such as input by keyboard, it is not easy to correctly and accurately addressing the location of defect. The drawback of this target program detection will reduce the reliability of the software and therefore there is required a new system for software testing which will generate effective test programs in a convenient and efficient manner.

SUMMARY OF THE INVENTION

Due to the previous described background that a conventional software testing by manual can not accurately addressing the location of defects (or bugs), it is a main object of the present invention to provide a general and useful method for addressing the displaying dynamic windows, therefore the windows based software can be operated accurately and the message system can be delivered precisely.

It is another object of the present invention to use this general and useful method that the users can write the script by themselves, or generate the script automatically, therefore the management of the windows will be better.

It is a further object of the present invention to use fuzzy technique to reduce the error of judgement.

Summary of the method for addressing the displaying dynamic windows is as follows:

The addressing method of the present invention uses a script interpreter, an addressing identification module and a current windows layer description module combined to realize the invention. Firstly, the script interpreter read in the current operation windows and generates a corresponding description of this windows. Next, the current windows layer description module construct a tree structure to describe every windows. Therefore, the addressing identification module finds the identifier code of the current windows and will handle this addressing windows.

The flow of script interpreter will first input the operational unit such as text, style, identifier and data of windows, then go to the addressing identification module after the counter increase one. Subsequently, the current windows layer description module will hook the creative message and construct a windows description tree structure to describe the windows. The tree structure is built by a sibling and child tree structure.

Afterwards, the addressing identification module calculates the value from the root node of the windows description tree structure and completes the calculation for every node of the tree structure. According to fuzzy identification technique, standard mode will take first and then define the condition according to the attribute of the unit need to be identified. Take the maximum value and the current windows identifier code after calculating every node of the windows description tree structure. Subsequently, a tester can operate this windows.

Due to the addressing method of the present invention, when the tester use a keyboard to simulate the input and defects encountered unexpectedly, the pop-up error message windows will keep on the screen until the user confirm this error.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
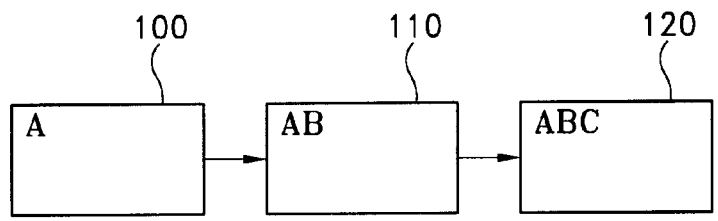
FIG. 1 is a block diagram showing the windows display according to the input by keyboard.
Figure 2:
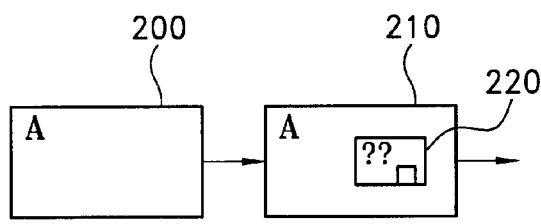
FIG. 2 is a block diagram showing the windows display according to the input by keyboard in which abnormal situation is happened.
Figure 3:
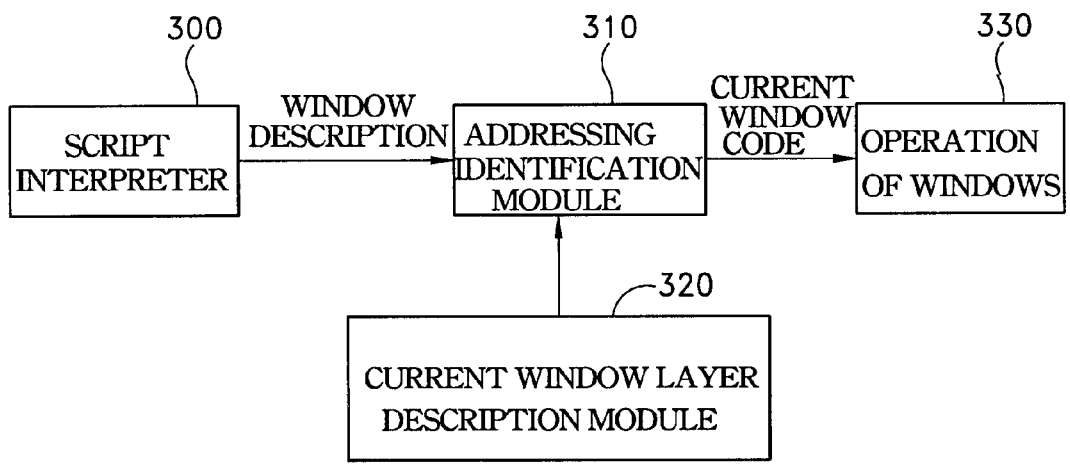
FIG. 3 is a block diagram showing the script interpreter, the addressing identification module, and the current windows layer description module.

The present invention discloses a method to addressing the dynamic windows. Any dynamic windows can be easily addressing according to the present invention. The detail description is as follows:

Referring to FIG. 3, the block diagram of the figure shows the structure to addressing according to the present invention, wherein the block 300 represents a script interpreter, the block 310 is a addressing identification module, the block 320 stands for the current windows layer description module, and the block 330 represents operation of windows. The basic structure of the present invention is firstly read the operational state from the script to the script interpreter 300; therefore a corresponding windows description parameters such as text of windows, style of windows and the other information of windows are generated. Next, input the information of the described windows to the addressing identification module 310.

At the moment of windows information input, the current windows layer description module 320 is used to hook the created information. Next, a series of judgement and management will be executed to construct a tree structure in order to describe every windows. After the windows description tree structure is constructed, the addressing identification module 310 will calculate the current windows identification code, therefore the addressing windows can proceed for the subsequent operation (i.e. enter the block 330 for subsequent operation of windows).

Figure 4:
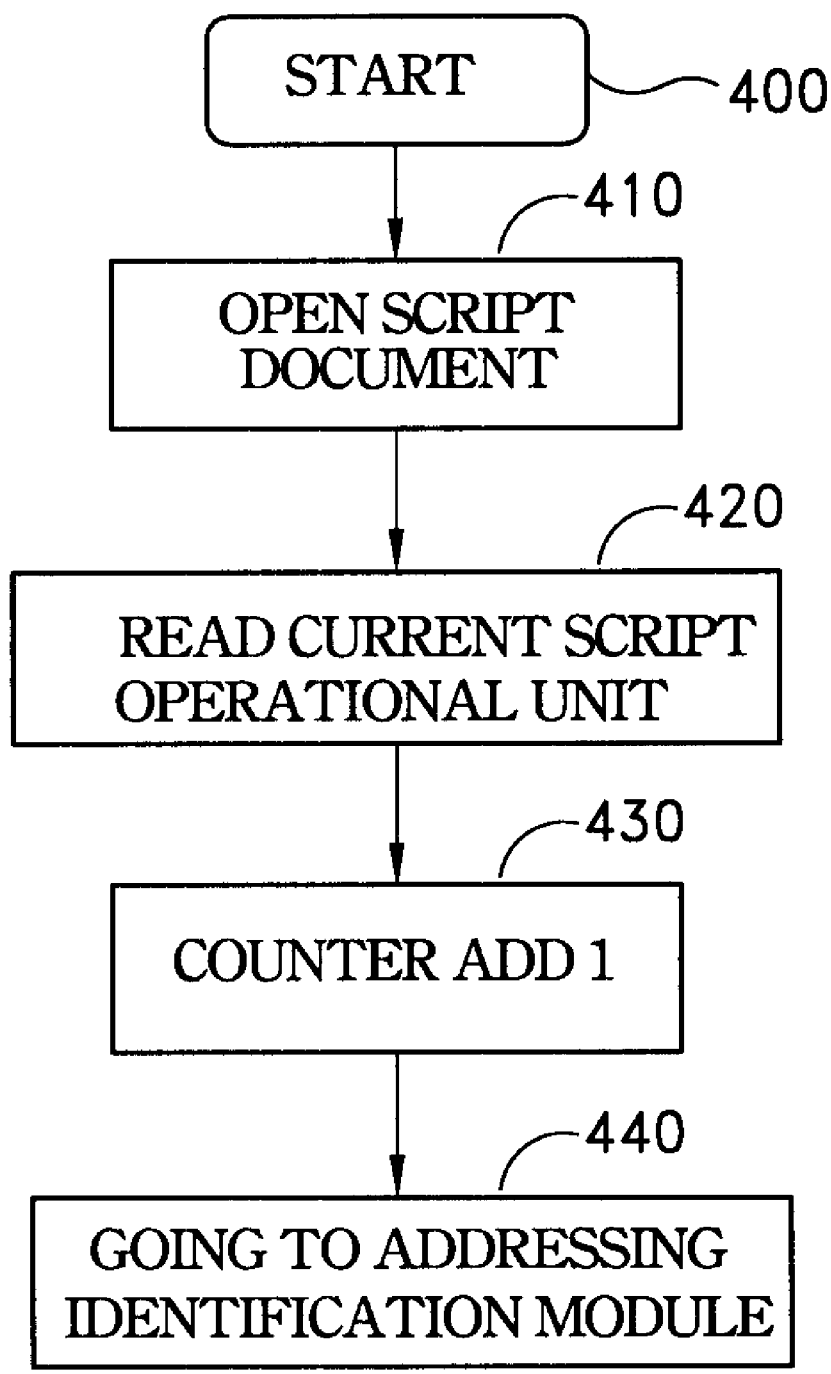
FIG. 4 is a block diagram showing the flow chart of the script interpreter in accordance with the present invention.

Referring to FIG. 4, the figure shows the flow of script interpreter. From the start block 400, the document of the script is opened (step 410) first, then read in the current script operational unit in step 420. The operational unit may include text, style, identifier (ID) and the other data of current windows. Later, the counter increases one in order to calculate the number of windows and for the subsequent analysis after current windows is filed (step 430). Next, go to the addressing identification module for further analysis (step 440).

Figure 5:
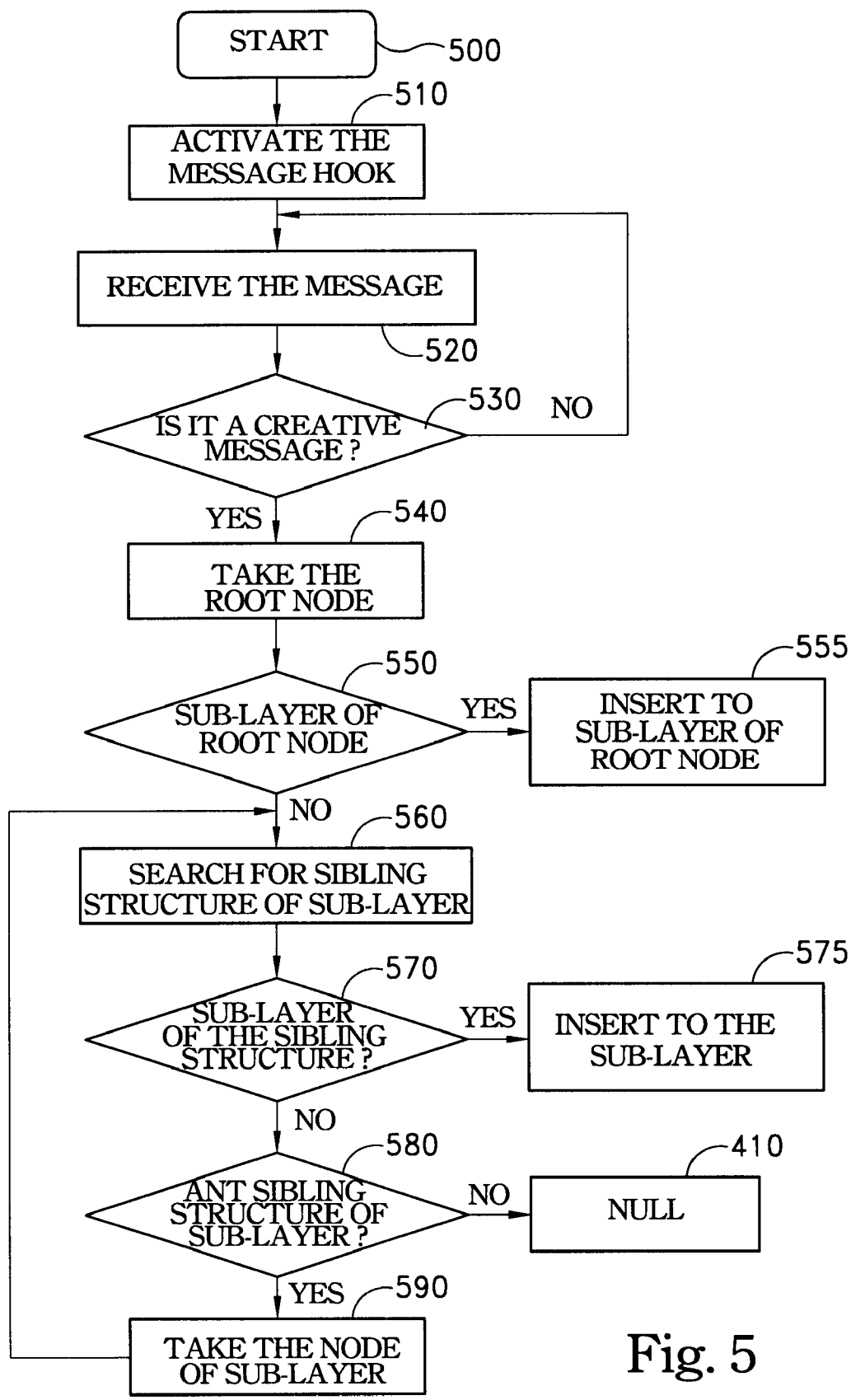
FIG. 5 is a block diagram showing the flow chart of the current windows layer description module in accordance with the present invention.

Referring now to FIG. 5, the figure describes the flow of current windows layer description module. Since the testing method of the present invention is proceeded without acknowledge of the source code of software, it is possible to add some new functions of the application software dynamically during the execution of the software without revising the source code. The most important method is using the message "hook" to intercept the event of the software. Hook is a powerful characteristic of windows programming that can intercept the event no matter it is a specific software or a windows system.

From the start block 500, the module will activate the message hook function at step 510. Next, when the message hook is activated, and the message is received (step 520), the flow go to step 530 to check if the message is a creative (new) message or not. If it is not a new message, then go back to step 520 to keep receiving the message.

Nevertheless, if the message received is a creative message, then go to step 540 to take the root node. After that, this creative message is analyzed to check if the message directly belongs to sub-layer of root node (decision step 550). If the answer is yes, then the creative message is inserted to the sub-layer of root node of this sibling and child tree structure (step 555). Otherwise check the sub-layer (child structure) of root node (step 560). Note that the sibling structure stands for the same layer and child structure stands for the sub-layer of the tree structure.

When search for the sibling structure of sub-layer in step 560, take the node of any of the sibling structure and check if the creative message belong to their sub-layer (decision step 570). If the answer is yes, then insert this message to its sub-layer in step 575. Otherwise go to the decision step 580 to check if there is any sibling structure in the next two layer (after all the sibling structure of sub-layer is checked). After the decision step 580 and no further sub-layer exist, go to step 410 to return a null. Additionally, take the node of sub-layer (step 590) and go back to step 560 to keep checking the rest sub-layer of the tree structure. From the repeated steps described above, the sibling and child tree structure of the present invention is constructed. Besides, every node in the tree structure represents for one windows description. Therefore, the addressing identification module can use this windows description tree structure and proceed further calculation and analysis.

Figure 6:
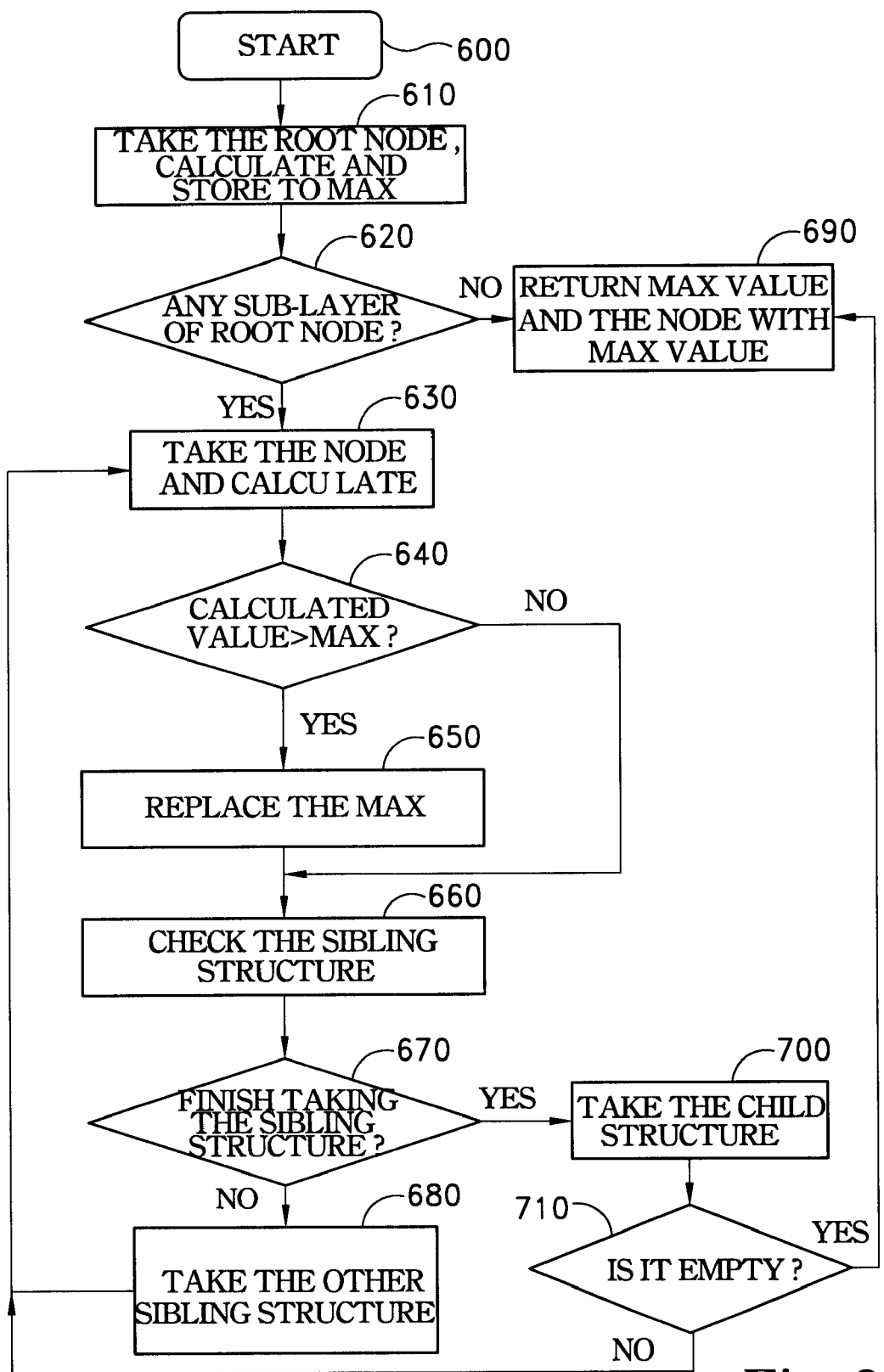
FIG. 6 is a block diagram showing the flow chart of the addressing identification module in accordance with the present invention.

Referring now to FIG. 6, This figure shows the calculation steps of addressing identification module. After the start block 600, take the root node and calculate the value of this windows (method of calculation will be described later), wherein the root node is taken from the tree structure constructed by the current windows layer description module. The calculated value will replace the initial setting value of zero and become a temporary stored maximum value (step 610). Subsequently, decision step 620 check if there is any sub-layer windows in the tree structure. If there is no sub-layer windows, then go to step 690 and return the maximum value and the node (windows). Otherwise take the node of sub-layer windows and calculate the value with the same method as root node (step 630).

Thereafter, decision step 640 compares the calculated value of sub-layer windows with temporary stored maximum value. If the calculated value is less than maximum value, go to step 660 for further processing step. Otherwise replace the temporary stored maximum value in step 650. In step 660, check the sibling structure of this layer and then go to the decision step 670 to look over if all the sibling structure is finished checking. If the answer is no, then go to step 680 and take the other sibling structure layer to do the same operation. Next, return to step 630 for further analysis. If all the sibling structure has been checked, go to the child structure and take the sub-layer node in step 700. Nevertheless, if there is an empty sub-layer, the decision step 710 will check and go back to step 690 to return the maximum value and the node after series of calculations. Otherwise, the flow will go back to step 630 for sub-layer windows calculation. Repeat the above processes and take the maximum value after comparison until the tree structure has been reviewed.

In the addressing identification module, the calculation of every windows is as follows:

Define $U_{Ai}$ as:

$$U_{Ai}(U_O) = (S_{text}(A_i) + S_{styleEx}(A_i) + S_{style}(A_i) + S_{id}(A_i) + S_{data}(A_i))/5$$

Wherein: $A_i$ ($A_1, A_2, \ldots, A_n$) are N standard modes and belong to F(V);

$U_O$ is the one need to identify and belong to V;

$S_{text}$ represents text of the windows that describes the function of Windows;

$S_{styleEx}$ represents extended style of the windows;

$S_{style}$ represents style of the windows;

$S_{id}$ represents identifier of the windows;

$S_{data}$ represents triple data of the windows;

If Ai fulfill the following condition:

$$U_{Ai}(U_O) = \max(U_{A1}(U_O) \ldots U_{An}(U_O)), \text{ then } U_O \text{ will also belong to } A_i.$$

In the above description, $S_{styleEx}(A_i)$, $S_{style}(A_i)$, $S_{id}(A_i)$, $S_{data}(A_i)$ define as the attribute of $U_O$ absolutely equal to the attribute of standard mode.

Regarding the calculation of $S_{text}(A_i)$, it follows:

If the character set need to identify is A: ( a b c d e), then the sub-set according to the sequence of characters are $S_A$:( (a), (a b), (a b c), (a b c d), . . . (b), (b c), (b c d), (b c d e). . . )

(1) take the longest sub-string B form $S_A$ and delete it from $S_A$;

(2) go back to step (1) if sub-string B not belong to the sub-string $A^i_{text}$ which is the type for text of the windows;

(3) If any B# belong to $S_B$, the common sub-string of sub-string B and B# is an empty set, add B into $S_B$;

(4) If $S_A$ is not empty, then go back to step (1). Otherwise proceed to next step;

(5) $S_B$ is the collection of sub-string.

Besides, Length($S_B$)=sum of all the length of sub-string,

And $S_{text}(A_i)$=Length($S_B$)/$A^i_{text}$,

According to the described principle for identification, one can take the current windows identifier code form $A_i$. The calculating method for the rules described above is called fuzzy technique. Through the manipulation of fuzzy technique, the error of calculated current windows identifier code is very low.

Through the general and useful method for addressing the displaying dynamic windows of the present invention, the type of automatic testing and on line help can be easily achieved. Besides, the message delivery and the operation identification become more precise. The present invention also support for the operation of flag and keyboard. The users can compose the script by themselves or the script can generate automatically. Therefore, the operation variation for operation and the requirement for the windows getting increasingly big, applications also become more diversity.

Due to the addressing method of the present invention, when the tester use a keyboard to simulate the input and the defects are encountered, the pop-up error message windows will keep on the screen until the user confirm this error.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for addressing a windows of a software program, said method comprising the steps of:

reading an operational unit from a script interpreter and generate a windows description;

hooking said windows description by a current windows layer description module and construct a windows description tree structure;

calculating a node of said windows description tree structure by fuzzy technique in a addressing identification module; and concluding a maximum value and a current windows identifier code by complete said node calculation of said windows description tree structure.

2. The method of claim 1, wherein after said windows description is generated, a counter in said script interpreter will increase one.

3. The method of claim 1, wherein said window description comprises text, style and data of said windows.

4. The method of claim 1, wherein said node constructed by said windows description tree structure represents said windows description.

5. The method of claim 1, wherein said windows description tree structure use a sibling and child tree structure to construct different layer of said windows description tree structure.

6. The method of claim 1, wherein said windows description tree structure is corresponding to every windows of said software program.

7. The method of claim 1, wherein said calculating step use text, extended style, style, identifier (ID) and data of said windows.

8. The method of claim 1, wherein said calculating step start from a root node of said windows description tree structure.

9. A method for addressing a windows of a software program, said method comprising the steps of:

reading an operational unit from a script interpreter and generate a windows description;

inputting said windows description into a addressing identification module;

hooking said windows description by a current windows layer description module and construct a windows description tree structure;

calculating a node of said windows description tree structure by fuzzy technique in said addressing identification module;

concluding a maximum value and a current windows identifier code by complete said node calculation of said windows description tree structure; and operating said windows according to said current windows identifier code.

10. The method of claim 9, wherein after said windows description is generated, a counter in said script interpreter will increase one.

11. The method of claim 9, wherein said window description comprises text, style and data of said windows.

12. The method of claim 9, wherein said node constructed by said windows description tree structure represents said windows description.

13. The method of claim 9, wherein said windows description tree structure use a sibling and child tree structure to construct different layer of said windows description tree structure.

14. The method of claim 9, wherein said windows description tree structure is corresponding to every windows of said software program.

15. The method of claim 9, wherein said calculating step use text, extended style, style, identifier (ID) and data of said windows.

16. The method of claim 9, wherein said calculating step start from a root node of said windows description tree structure.

* * * * *